# 3,542,693
CATALYTIC SYSTEM CONTAINING DISUBSTITUTED CARBAMATES

John A. Price, Swarthmore, Pa. (% Avisun Corporation, Marcus Hook, Pa. 19061), and Marco A. Achon, Marques de Urquijo u° 4, Madrid, Spain
No Drawing. Filed Dec. 13, 1967, Ser. No. 690,095
Int. Cl. C08f 15/04
U.S. Cl. 252—429                                6 Claims

ABSTRACT OF THE DISCLOSURE

A coordination catalyst system for the copolymerization of ethylene with other polymerizable unsaturated hydrocarbons consisting of the product obtained by mixing in an inert solvent, a vanadium salt, an alkyl aluminum dihalide and a N,N-disubstituted carbamate having the general formula

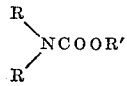

wherein R and R' are hydrocarbon radicals which contain no unsaturation other than that derived from aromatic radicals.

---

This invention relates to the copolymerization of ethylene with other polymerizable unsaturated hydrocarbons, and more particularly to novel catalyst systems for effecting such copolymerization.

The copolymerization of ethylene and propylene in the presence of a coordination complex catalyst, such as the reaction product of vanadium tetrachloride or vanadium oxytrichloride and an aluminum alkyl such as triisobutyl aluminum or diethylene aluminum chloride, in an inert solvent to yield a product resembling unvulcanized rubber is known to the art, and is described in Belgian Pat. 533,655. Such copolymers may be cross-linked by peroxides or other free-radical generators to form a synthetic elastomer which is highly stable to degradation by ozone due to the almost complete absence of unsaturation in the molecule. It is also known in the art to copolymerize ethylene and propylene or other alpha-olefins with a diolefin in order to introduce unsaturation into the molecule to permit vulcanization by curing systems commonly used in the rubber industry. An example of such terpolymers is shown in U.S. Pat. No. 3,300,866. In such processes, after completion of the reaction, the reaction mixture is treated with an alcohol or other polar material to destroy the activity of the catalyst and to convert the catalyst residues to water-soluble compounds. The solution of copolymer in the solvent is then washed with water and steam-stripped to remove the solvent and to recover the copolymer as a suspension of crumbs in water.

Using the catalytic systems known to the prior art, such as the reaction product of vanadium oxytrichloride or vanadium tetrachloride with an aluminum alkyl, the greater part of the ethylene and propylene is converted to the desired noncrystalline random copolymer which is soluble in a solvent. However, a small, but significant, part of the ethylene and/or propylene is converted either to a crystalline homopolymer of either, or both, of the monomers, or to a copolymer in which the molecule contains long blocks of ethylene and/or propylene homopolymer segments which are crystalline, the crystalline structure being indicated by X-ray analysis. If such crystalline copolymers or homopolymers are not separated from the desired amorphous copolymer, the raw and compounded Mooney viscosity of the latter is undesirably high, causing difficulties in processing. Further, the crystalline polymers adversely affect the physical properties of the desirable cured copolymer.

The crystalline polymers are generally insoluble in the polymerization solvent and appear therein as a swollen gel. It is extremely difficult to separate the gel by filtration, but it can be removed by other methods, such as that shown in U.S. Pat. No. 3,071,566 to Cassar and Tice. Removal by such a method adds another processing step, which increases the cost of the process.

It is an object of this invention to provide a catalyst system for the copolymerization of mono-olefins or a mixture of mono-olefins and diolefins which will effect the polymerization in a manner such that only traces, if any, of crystalline polymers are formed.

It is a further object of this invention to provide a catalyst system which will effect copolymerization at a faster rate than when using conventional catalyst systems, such as a combination of vanadium oxytrichloride and diethyl aluminum chloride.

In accordance with the present invention, it has been discovered that a three-component catalyst system consisting of the product obtained by mixing, in an inert solvent, a vanadium salt such as vanadium oxytrihalide or a vanadium tetrahalide, an alkyl aluminum dihalide, and an N,N-disubstituted carbamate having the general formula:

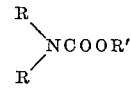

wherein R and R' are hydrocarbon radicals containing no unsaturation other than that derived from aromatic radicals.

The aluminum component of the novel catalyst system may be any alkyl aluminum dihalide, such as ethyl aluminum dichloride, isobutyl aluminum dichloride, propyl aluminum dichloride, the corresponding bromine or iodine analogs, or such aluminum compounds having a larger number of carbon atoms than those illustrated hereinabove. The vanadium component of the catalyst system may be vanadium oxytrichloride, vanadium tetrachloride, vanadium oxytribromide, or vanadium tetrabromide. The mol ratio of aluminum compound to vanadium compound should be from about 1:1 to 10:1, preferably from about 2:1 to about 5:1.

Preferably, the carbamates of this invention are ones wherein R is an aryl radical and R' is an alkyl radical, though not limited thereto. The number of carbon atoms in R and R' is not material to this invention. Illustrative of suitable compounds are:

ethyl-N,N-diphenyl carbamate,
butyl-N,N-dinaphthyl carbamate,
octyl-N,N-dibenzyl carbamate,
methyl-N,N-diphenyl carbamate,
butyl-N,N-diphenyl carbamate,
ethyl-N,N-dinaphthyl carbamate,
isoamyl-N,N-diphenyl carbamate,
t-butyl-N,N-diphenyl carbamate,
methyl-N,N-dimethyl carbamate,
iso-propyl-N,N-diethyl carbamate,
cyclohexyl-N,N-dimethyl carbamate, etc.

The mol ratio of aluminum compound to the carbamate compound must be from about 6:1 to about 1.5:1, preferably, from 3:1 to 2:1, since at higher or lower ratios elastomeric polymer is not formed.

Copolymerization reaction conditions include temperatures from 0° C. to 150° C., and pressures of from 0 to 150 p.s.i.g. When operating at lower pressures, i.e., from 0 to 10 p.s.i.g., it is preferred to recirculate the feed continuously to the reactor at a rate such as to maintain the described pressure therein. Preferably, the reaction conditions are from about 25° C. to 50° C., and from about 30–55 p.s.i.g.

As solvents for the reaction, saturated hydrocarbons such as hexane, heptane or octane may be used. Aromatic hydrocarbons such as benzene, toluene, or xylene are also suitable, as are halogenated hydrocarbons such as perchloroethylene. Benzene is preferred, however, since reaction rates are somewhat higher in benzene than in aliphatic solvents, and it is less costly and easier to recover than the chlorinated hydrocarbon solvents.

The gaseous feed to the copolymerization reactor should consist of from 20% to 80% ethylene and from 80% to 20% propylene or butene-1 depending on the amount of ethylene which it is desired to incorporate into the copolymer. When it is desired to incorporate unsaturation into the molecule, it is desirable to add to the reactor sufficient diolefin, for example cyclopentadiene, to incorporate about 1% to 10% unsaturation into the polymer. The diolefin can be added in its entirety at the start of the reaction, but it is preferably added in increments during the reaction, in order to incorporate it more randomly into the polymer.

At the end of the desired reaction time, when operating batchwise, the reactor is depressurized, the catalyst activity is killed by the addition of an alcohol, and the product is recovered. Usually, the reaction is stopped when the reaction mixture contains about 5% to 15% by weight of product, since if the reaction goes much further, the solution becomes too viscous for easy handling.

In order that those skilled in the art may more fully understand the nature of our invention and the method for carrying it out, the following examples are given.

CONTROL 1

A polymerization bottle is charged with 100 ml. of benzene, and 0.861 millimol of ethylene aluminum dichloride is added. 0.287 millimol of $VOCl_3$ is then added, and the polymerization bottle, which is fitted with a magnetic stirrer, is put in an oil bath at 40° C. The bottle is then pressured to 45 p.s.i.g. with a mixture of 30 mol percent ethylene and 70 mol percent propylene. Polymerization starts immediately, and is continued for 30 minutes while maintaining the pressure by continuous addition of the ethylene-propylene mixture. The reaction is then killed by the addition of methanol, which destroys the catalyst and precipitates the benzene-soluble polymer. A total of 1.08 grams of copolymer is recovered, .89 gram of which is insoluble in benzene. This polymer contains about 90 percent ethylene, as determined by infra-red, and is nonelastomeric in character.

CONTROL 2

The procedure of Control 1 is followed, except that 0.143 millimol of ethylene-N,N-diphenyl carbamate is added prior to pressuring the bottle with the ethylene-propylene mixture. This procedure results in 1.82 grams of a somewhat rubbery copolymer containing over 90 percent ethylene, all of which is soluble in benzene.

EXAMPLE 1

The procedure of Control 2 is followed, except that the amount of said carbamate is increased to 0.287 millimol, resulting in 2.94 grams of benzene-soluble elastomeric product having an ethylene content of about 61.6 percent and a reduced specific viscosity (RSV) of 4.09 as determined by ASTM test D 1601–61.

EXAMPLE 2

The procedure of Control 2 is followed, except that the amount of said carbamate is increased to 0.430 millimol; 2.63 grams of elastomeric copolymer are recovered, having a RSV of 3.59 and an ethylene content of about 66.8 percent, all of which is soluble in benzene.

The foregoing examples illustrate the formation of ethylene-propylene copolymers which are essentially free of unsaturation, and which may be cross-linked with a peroxide cure to form synthetic rubbers which are extremely resistant to ozone. However, these copolymers cannot be vulcanized by the recipes commonly used to vulcanize unsaturated polymers such as natural rubber, SBR, or butyl rubber. We have found that our new catalyst systems are also adapted to catalyze the terpolymerization of ethylene, propylene and a diolefin, and the tetrapolymerization of ethylene, propylene, indene, and a diolefin to yield polymers containing unsaturation, which may be cross-linked by conventional rubber cures. Conjugated diolefins, such as butadiene or isoprene may be used in the polymerization, but nonconjugated diolefins are preferred, such as dicyclopentadiene, 1,5-hexadiene, or other straight chain dienes having terminal unsaturation, since these dienes appear to enter the polymer in a more random fashion than the conjugated dienes, and the properties of the cured polymer are better.

EXAMPLE 3

This example shows the use of our novel catalyst system in the production of a sulfur vulcanizable tetrapolymer of ethylene, propylene, indene and dicyclopentadiene. Five polymerization bottles are charged with 200 ml. benzene, 1.72 millimol of ethylene aluminum dichloride, 0.574 millimol of $VOCl_3$, 0.574 millimol of ethylene-N,N-diphenyl carbamate, 0.92 ml. of indene and 2.6 ml. of dicyclopentadiene. The bottles were then pressured with a mixture of 30 percent ethylene and 70 percent propylene to 45 p.s.i.g., and placed in the oil bath at 40° C. After seven minutes 2.6 ml. of cyclopentadiene was added. After 30 minutes the reaction was stopped, and the reaction product worked up to recover a total of 20.3 grams of tetrapolymer having a RSV of 2.91 and an ethylene content of 78.6 percent. One hundred parts of the tetrapolymer were then compounded with fifty parts of HAF carbon black, 1.5 parts of sulfur, 5 parts of ZnO, 1.5 parts of tetramethylthiuram monosulfide, and 0.5 parts of mercaptobenzothiazole. The compounded polymer was then cured at 320° F. for 30 minutes. The vulcanized material had the following physical properties:

Tensile strength—2725 p.s.i.
100% modulus—400 p.s.i.
200% modulus—1125 p.s.i.
300% modulus—1975 p.s.i.
Percent elongation—400
Shore A hardness—65
Permanent set—25
Scott plastometer—90

While the particular compositions and methods described herein are well adapted to meet the objects of the present invention, various modifications or changes may be resorted to without departing from the scope of the invention as defined in the claims.

We claim:
1. A coordination catalyst system comprising the product obtained by mixing in an inert solvent a vanadium halide or oxyhalide, an alkyl aluminum dihalide, and a N,N-disubstituted carbamate having the general formula

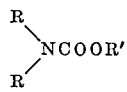

wherein R and R' are hydrocarbon radicals selected from the group consisting of alkyl and aryl, the mol ratio of the aluminum compound to the vanadium compound being in the range of from about 1:1 to about 10:1 and the mol ratio of aluminum compound to carbamate being from about 5:1 to about 1.5:1.

2. A coordination catalyst system as described in claim 1 wherein the mol ratio of aluminum compound to vanadium compound is from about 2:1 to about 5:1, and the mol ratio of aluminum compound to carbamate compound is from about 3:1 to about 2:1.

3. A coordination catalyst system as described in claim 2 wherein the vanadium salt is selected from the group consisting of vanadium oxytrichloride, vanadium tetrachloride, vanadium oxytribromide and vanadium tetrabromide.

4. A coordination catalyst system as described in claim 3 wherein the aluminum compound is selected from the group consisting of ethyl aluminum dichloride, isobutyl aluminum dichloride and propyl aluminum dichloride.

5. A coordination catalyst system as described in claim 4 wherein the R and R' radicals of the carbamate are aryl and alkyl radicals, respectively.

6. A coordintion catalyst system as described in claim 5 wherein the N,N-disubstituted carbamate is ethyl N,N-diphenyl carbamate.

References Cited
UNITED STATES PATENTS

| | | |
|---|---|---|
| 3,225,020 | 12/1965 | Coover. |
| 3,278,643 | 10/1966 | Achon. |
| 3,303,175 | 2/1967 | Achon. |
| 3,377,326 | 4/1968 | Loveless et al. |

PATRICK P. GARVIN, Primary Examiner

U.S. Cl. X.R.

260—88.2